US009743296B2

(12) United States Patent
Makhlouf et al.

(10) Patent No.: US 9,743,296 B2
(45) Date of Patent: Aug. 22, 2017

(54) METHODS AND SYSTEMS FOR EMULATING TESTING-PLAN CHANNEL CONDITIONS IN WIRELESS NETWORKS

(71) Applicant: MOTOROLA SOLUTIONS, INC., Schaumburg, IL (US)

(72) Inventors: Isam R Makhlouf, Lake Zurich, IL (US); Samir A Sawaya, San Diego, CA (US); John D Toone, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 275 days.

(21) Appl. No.: 14/275,073

(22) Filed: May 12, 2014

(65) Prior Publication Data
US 2015/0327088 A1 Nov. 12, 2015

(51) Int. Cl.
H04W 24/06 (2009.01)
H04W 16/22 (2009.01)
H04L 12/24 (2006.01)
H04L 1/24 (2006.01)
H04W 52/28 (2009.01)
H04W 52/24 (2009.01)

(52) U.S. Cl.
CPC ......... H04W 24/06 (2013.01); H04W 52/241 (2013.01); H04L 1/242 (2013.01); H04L 41/5038 (2013.01); H04W 16/22 (2013.01); H04W 52/282 (2013.01)

(58) Field of Classification Search
CPC ............ H04W 52/241; H04W 52/243; H04W 52/265; H04W 52/267; H04W 52/282; H04W 24/06; H04W 24/08; H04W 16/22; H04L 1/242; H04L 41/5038
See application file for complete search history.

(56) References Cited

U.S. PATENT DOCUMENTS

| 6,505,114 | B2 | 1/2003 | Luciani |
| 6,842,726 | B1 | 1/2005 | Scharosch et al. |
| 7,522,918 | B2 | 4/2009 | Wachter et al. |
| 7,783,296 | B2 | 8/2010 | Kaplan et al. |
| 2003/0231655 | A1* | 12/2003 | Kelton ............... H04N 7/17318 370/468 |

(Continued)

FOREIGN PATENT DOCUMENTS

EP 2533563 A1 12/2012
WO 2013117092 A1 8/2013

Primary Examiner — Yemane Mesfin
Assistant Examiner — Peter Chen

(57) ABSTRACT

Disclosed herein are methods and systems for emulating testing-plan channel conditions in wireless networks. One embodiment takes the form of a process that includes identifying a data-rate threshold and one or more testing-plan channel conditions. The process also includes identifying testing-scenario channel conditions corresponding to the testing-plan channel conditions. The process also includes selecting an attenuation offset based on a comparison of the one or more identified testing-scenario channel conditions to the one or more identified testing-plan channel conditions. The process also includes measuring a data rate with a testing-scenario attenuation level set equal to the selected attenuation offset. The process also includes storing testing-plan-compliance data associated with the measured data rate and the data-rate threshold.

6 Claims, 11 Drawing Sheets

(56) References Cited

U.S. PATENT DOCUMENTS

| | | | |
|---|---|---|---|
| 2005/0055195 A1* | 3/2005 | Hernandez-Mondragon | H04W 16/22 703/23 |
| 2007/0053287 A1* | 3/2007 | Li | H04L 1/0002 370/229 |
| 2008/0004062 A1 | 1/2008 | Nibe | |
| 2008/0108352 A1* | 5/2008 | Montemurro | H04W 36/30 455/437 |
| 2011/0007655 A1* | 1/2011 | Pauly | H04L 1/0001 370/252 |
| 2011/0141931 A1* | 6/2011 | Bae | H04W 52/12 370/252 |
| 2012/0106383 A1* | 5/2012 | Gormley | H04L 1/0026 370/252 |
| 2012/0252438 A1 | 10/2012 | Mehio et al. | |
| 2013/0052959 A1 | 2/2013 | Rubin et al. | |
| 2013/0237245 A1 | 9/2013 | Tinnakornsrisuphap et al. | |
| 2014/0087749 A1* | 3/2014 | Mar | H04L 5/0023 455/452.2 |

* cited by examiner

*900*

| COVERAGE-MAP POLYGON | TESTING PLAN |
|---|---|
| POLYGON 702 | PLAN 902 |
| POLYGON 704 | PLAN 904 |
| POLYGON 706 | PLAN 906 |
| POLYGON 708 | PLAN 908 |
| POLYGON 710 | PLAN 910 |
| POLYGON 712 | PLAN 912 |
| POLYGON 714 | PLAN 914 |
| POLYGON 716 | PLAN 916 |
| POLYGON 718 | PLAN 918 |
| POLYGON 720 | PLAN 920 |
| POLYGON 722 | PLAN 922 |
| POLYGON 724 | PLAN 924 |
| ... | ... |
| POLYGON N | PLAN N |

*FIG. 9*

METHODS AND SYSTEMS FOR EMULATING TESTING-PLAN CHANNEL CONDITIONS IN WIRELESS NETWORKS

BACKGROUND OF THE INVENTION

Millions of people around the world make daily use of various computing and communication devices. Many of these devices can be accurately characterized as being wireless-communication devices (WCDs), in that they are equipped and configured such that they are able to engage in wireless forms of communication directly with one another and/or via various wireless networks. Examples of commonly used WCDs include cell phones, smartphones, tablets, notebook computers, laptop computers, and the like. The wireless networks—via which these WCDs engage in wireless communication—typically operate according to one or more relatively long-range wireless-communication protocols (e.g., Long-Term Evolution (LTE) and the like), one or more relatively short-range wireless-communication protocols (e.g., Wi-Fi and the like), and/or one or more land mobile radio (LMR) protocols (e.g., European Telecommunications Standards Institute Digital Mobile Radio (ETSI-DMR), Terrestrial Trunked Radio (TETRA), APCO Project 25 (P25), Digital Mobile Radio (DMR), and the like).

To verify certain levels of network performance—as to metrics such as data throughput and the like, operators of wireless networks often conduct performance-verification testing (a.k.a. "coverage acceptance testing") at various locations within the coverage footprint of their respective networks. If conducted using a vehicle, such testing is often referred to as "drive testing" a wireless network. It is often the case, however, that the actual channel conditions present during testing (i.e., the "testing-scenario channel conditions") do not match the channel conditions that were assumed and/or expected when a given testing plan was made (i.e., the "testing-plan channel conditions"). Accordingly, there is a need for methods and systems for emulating testing-plan channel conditions in wireless networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 9 depicts an example table correlating coverage-map polygons with wireless-network testing plans in accordance with an embodiment.

Figure 1:
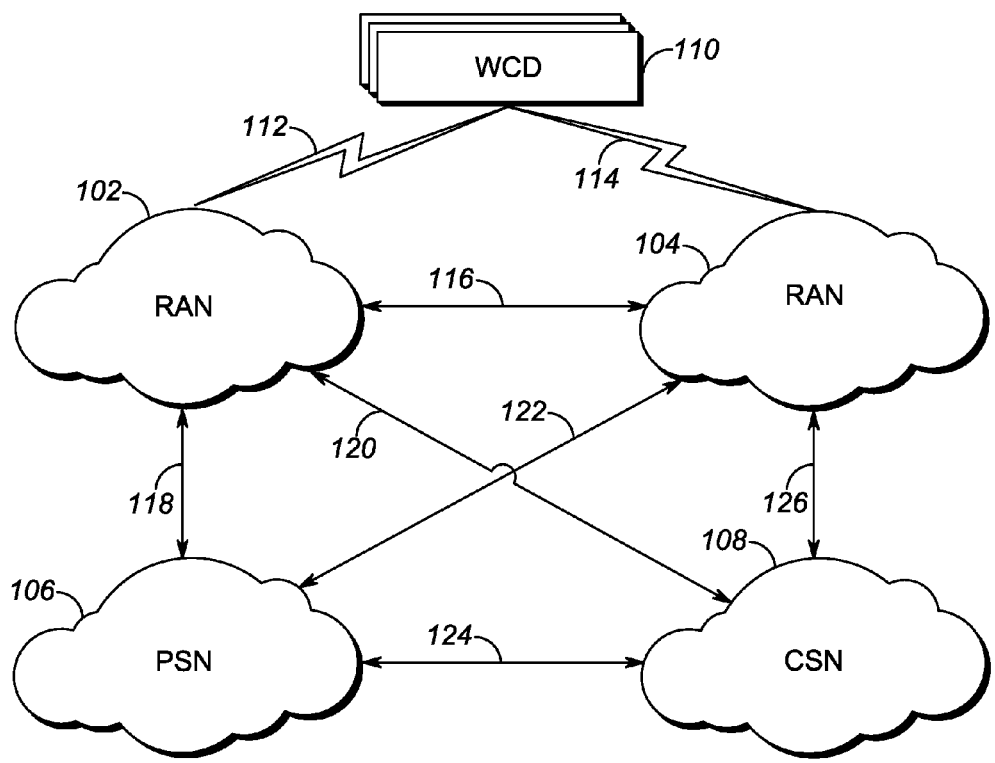
FIG. 1 depicts an example communication system in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for emulating testing-plan channel conditions in wireless networks. One embodiment takes the form of a method that includes identifying a data-rate threshold and one or more testing-plan channel conditions. The method also includes identifying testing-scenario channel conditions corresponding to the testing-plan channel conditions. The method also includes selecting an attenuation offset based on a comparison of the one or more identified testing-scenario channel conditions to the one or more identified testing-plan channel conditions. The method also includes measuring a data rate with a testing-scenario attenuation level set equal to the selected attenuation offset. The method also includes storing testing-plan-compliance data associated with the measured data rate and the data-rate threshold.

Another embodiment takes the form of a wireless-network testing system that includes an antenna structure, a modem, a signal-attenuation module coupled inline in a receive path between the antenna structure and the modem, a processor, and data storage containing instructions executable by the processor for causing the system to carry out at least the functions described in the preceding paragraph. Moreover, any of the variations and permutations described in the ensuing paragraphs and anywhere else in this disclosure can be implemented with respect to any embodiments, including with respect to any method embodiments and with respect to any system embodiments.

The preceding paragraph is an example of the fact that, in this disclosure, various elements of one or more of the described embodiments are referred to as modules that carry out (i.e., perform, execute, and the like) various functions described herein. As the term "module" is used herein, each described module includes or at least has access to any necessary hardware (e.g., one or more processors, microprocessors, microcontrollers, microchips, application-specific integrated circuits (ASICs), field programmable gate arrays (FPGAs), memory devices, and/or one or more of any other type or types of devices and/or components) deemed suitable by those of skill in the relevant art for a given implementation. Each described module also includes or at least has access to any necessary instructions executable for carrying out the one or more functions described as being carried out by the particular module, where those instructions could take the form of or at least include hardware (i.e., hardwired) instructions, firmware instructions, software instructions, and/or the like, stored in any non-transitory computer-readable medium deemed suitable by those of skill in the relevant art.

In at least one embodiment, the following step is also carried out: determining a current location; in at least one such embodiment, identifying the data-rate threshold and the one or more testing-plan channel conditions involves identifying the data-rate threshold and the one or more testing-plan channel conditions based at least in part on the determined current location.

In at least one embodiment, the one or more identified testing-plan channel conditions includes a testing-plan speed, the one or more identified testing-scenario channel conditions includes a testing-scenario speed, and selecting the attenuation offset based on a comparison of the one or more identified testing-scenario channel conditions to the one or more identified testing-plan channel conditions involves selecting the attenuation offset based on a comparison of the testing-scenario speed to the testing-plan speed.

In at least one embodiment, the one or more testing-plan channel conditions includes a testing-plan fading channel type, the one or more identified testing-scenario channel conditions includes a testing-scenario fading channel type, and selecting the attenuation offset based on a comparison of the one or more identified testing-scenario channel conditions to the one or more identified testing-plan channel conditions involves selecting the attenuation offset based on a comparison of the testing-scenario fading channel type to the testing-plan fading channel type.

In at least one embodiment, the one or more testing-plan channel conditions includes a testing-plan antenna correlation, the one or more identified testing-scenario channel conditions includes a testing-scenario antenna correlation, and selecting the attenuation offset based on a comparison of the one or more identified testing-scenario channel conditions to the one or more identified testing-plan channel conditions involves selecting the attenuation offset based on a comparison of the testing-scenario antenna correlation to the testing-plan antenna correlation.

In at least one embodiment, an identified testing-plan channel condition specifies validating in-building coverage, and selecting the attenuation offset based on a comparison of the one or more identified testing-scenario channel conditions to the one or more identified testing-plan channel conditions involves including in the attenuation offset a positive attenuation value calibrated to emulate in-building signal-penetration loss.

In at least one embodiment, the following two steps are also carried out: identifying a first required SINR based at least in part on one or both of the data-rate threshold and the one or more testing-plan channel conditions, and identifying a second required SINR based at least in part on one or both of the data-rate threshold and the one or more testing-scenario channel conditions; in at least one such embodiment, selecting the attenuation offset based on a comparison of the identified testing-scenario channel conditions to the identified testing-plan channel conditions involves selecting the attenuation offset to be equal to the difference between the first required SINR and the second required SINR.

In at least one embodiment, the following step is also carried out: determining a respective attenuation-offset component for each pair of testing-plan channel condition and corresponding testing-scenario channel condition; in at least one such embodiment, selecting the attenuation offset based on a comparison of the one or more identified testing-scenario channel conditions to the one or more identified testing-plan channel conditions involves selecting the attenuation offset to be equal to the sum of the determined respective attenuation-offset components.

In at least one embodiment that involves selecting the attenuation offset to be equal to the sum of the determined respective attenuation-offset components, the one or more pairs of testing-plan channel condition and corresponding testing-scenario channel condition include a testing-plan speed and a testing-scenario speed; in at least one such embodiment, the testing-scenario speed is greater than the testing-plan speed, and the respective attenuation-offset component for this pair is a negative attenuation value; in at least one other such embodiment, the testing-scenario speed is less than the testing-plan speed, and the respective attenuation-offset component for this pair is a positive attenuation value.

In at least one embodiment that involves selecting the attenuation offset to be equal to the sum of the determined respective attenuation-offset components, the one or more pairs of testing-plan channel condition and corresponding testing-scenario channel condition include a testing-plan fading channel type and a testing-scenario fading channel type.

In at least one embodiment that involves selecting the attenuation offset to be equal to the sum of the determined respective attenuation-offset components, the one or more pairs of testing-plan channel condition and corresponding testing-scenario channel condition include a testing-plan antenna correlation and a testing-scenario antenna correlation; in at least one such embodiment, the testing-scenario antenna correlation is greater than the testing-plan antenna correlation, and the respective attenuation-offset component for this pair is a negative attenuation value; in at least one other such embodiment, the testing-scenario antenna correlation is less than the testing-plan antenna correlation, and the respective attenuation-offset component for this pair is a positive attenuation value.

In at least one embodiment that involves selecting the attenuation offset to be equal to the sum of the determined respective attenuation-offset components, the one or more pairs of testing-plan channel condition and corresponding testing-scenario channel condition include a testing-plan in-building status and a testing-scenario in-building status; in at least one such embodiment, the testing-plan in-building status is true, the testing-scenario in-building status is false, and the respective attenuation-offset component for this pair is a positive attenuation value; in at least one other such embodiment, the testing-plan in-building status is false, the testing-scenario in-building status is true, and the respective attenuation-offset component for this pair is a negative attenuation value.

In at least one embodiment, the following step is also carried out: attenuating the received signal by a device-emulation attenuation level for measuring the data rate, where the device-emulation attenuation level is a fixed value calibrated to account for one or more hardware-configuration differences between the testing system and a user equipment.

Before proceeding with the detailed description of the figures, it is explicitly noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as constructively preceded by a clause such as "In at least one embodiment, . . . " And it is for reasons akin to brevity and clarity of presentation that this implied leading clause is not repeated ad nauseum in the following detailed description of the figures.

FIG. 1 depicts an example communication system 100 that includes a radio access network (RAN) 102, a RAN 104, a packet-switched network (PSN) 106, a circuit-switched network (CSN) 108, WCDs 110, an air interface 112, an air interface, 114, and communication links 116-126.

An example RAN 102 is discussed below in connection with FIG. 2, though in general, the RAN 102 includes typical RAN elements such as base stations, base station controllers (BSCs), routers, switches, and the like, arranged, connected, and programmed to provide wireless service to user equipment (e.g., the WCDs 110 via the air interface 112) in a manner known to those of skill in the relevant art. Moreover, the RAN 102 may include one or more network access servers (NASs), gateways, and the like for communicating with one or more other entities and/or networks, such as the RAN 104, the PSN 106, and the CSN 108, as examples.

The RAN 104 may be similar in structure and arrangement to the example RAN 102 that is discussed below in connection with FIG. 2; in some embodiments, however, the RAN 104 has a different structure and arrangement than does RAN 102; those of skill in the relevant art are familiar with multiple types of RANs. In at least one embodiment, the RAN 104 is a public-safety RAN; in such embodiments, the RAN 104 is equipped, configured, and programmed to provide one or more public-safety agencies with wireless access (via, e.g., the air interface 114) to one or more networks, to facilitate provision of the communication and computing needs of those one or more public-safety agencies. The RAN 104 may include or be connected to a dispatch center that itself may be communicatively connected with the PSN 106 and also with the CSN 108, for retrieving and transmitting any necessary public-safety-related data and/or communications. The RAN 104 may include or be connected to any necessary computing, data-storage, and data-presentation resources utilized by public-safety personnel in carrying out their public-safety functions. Moreover, the RAN 104 may include one or more network access servers (NASs), gateways, and the like for communicating with one or more other entities and/or networks, such as the RAN 102, the PSN 106, and the CSN 108, as examples.

The PSN 106 may be, include, or be a part of the global network of interconnected networks typically referred to as the Internet, but could just as well be any other packet-switched network. Entities (i.e., servers, routers, computers, and the like) that communicate over the PSN 106 may be identified by a network address such as an Internet Protocol (IP) address. Moreover, the PSN 106 may include one or more NASs, gateways, and the like for communicating with one or more other entities and/or networks, such as the RAN 102, the RAN 104, and the CSN 108, as examples.

The CSN 108 may be, include, or be a part of the circuit-switched telephone network commonly referred to as the public switched telephone network (PSTN), but could just as well be any other circuit-switched network, and in general functions to provide circuit-switched communications to various communication entities as is known in the relevant art. Moreover, the CSN 108 includes one or more NASs, gateways, and the like for communicating with one or more other entities and/or networks, such as the RAN 102, the RAN 104, and the PSN 106, as examples.

Each WCD 110 may be any suitable computing and communication device configured to engage in wireless communication with the RAN 102 over the air interface 112 and/or with the RAN 104 over the air interface 114. As such, each WCD 110 may be equipped, configured, and programmed to engage in such wireless communications in accordance with one or more wireless-communication protocols such as LTE, Wi-Fi, DMR, P25, TETRA, and the like. In at least one embodiment, one or more of the WCDs 110 is or includes a cell phone, a smartphone, a tablet, a laptop computer, a mobile hotspot, a Universal Serial Bus (USB) dongle or other USB device, and/or one or more other types of WCDs known to those of skill in the relevant art. In at least one embodiment, one or more of the WCDs 110 is or includes a wireless-network testing system, as described herein. And certainly numerous other examples of WCDs could be listed here, as is known to those having skill in the relevant art.

Any one or more of the communication links 116-126 could be or include one or more wireless-communication links and/or one or more wired-communication links. Furthermore, it is noted that each of the air interfaces 112 and 114 is depicted in FIG. 1 with a respective lightning-bolt graphic, which is a graphic that is quite often used to denote wireless communication (and is so used in this example as well); this graphical choice is not made, however, to the exclusion of one or more of the communication links 116-126—each depicted as a double-sided arrow—being or at least including wireless-communication links as well. As can be seen in FIG. 1, the communication link 116 connects the RAN 102 and the RAN 104; the communication link 118 connects the RAN 102 and the PSN 106; the communication link 120 connects the RAN 102 and the CSN 108; the communication link 122 connects the RAN 104 and the PSN 106; the communication link 124 connects the PSN 106 and the CSN 108; and the communication link 126 connects the RAN 104 and the CSN 108. This arrangement is provided purely by way of example, as other arrangements could be implemented by those of skill in the relevant art in various different contexts.

Figure 2:
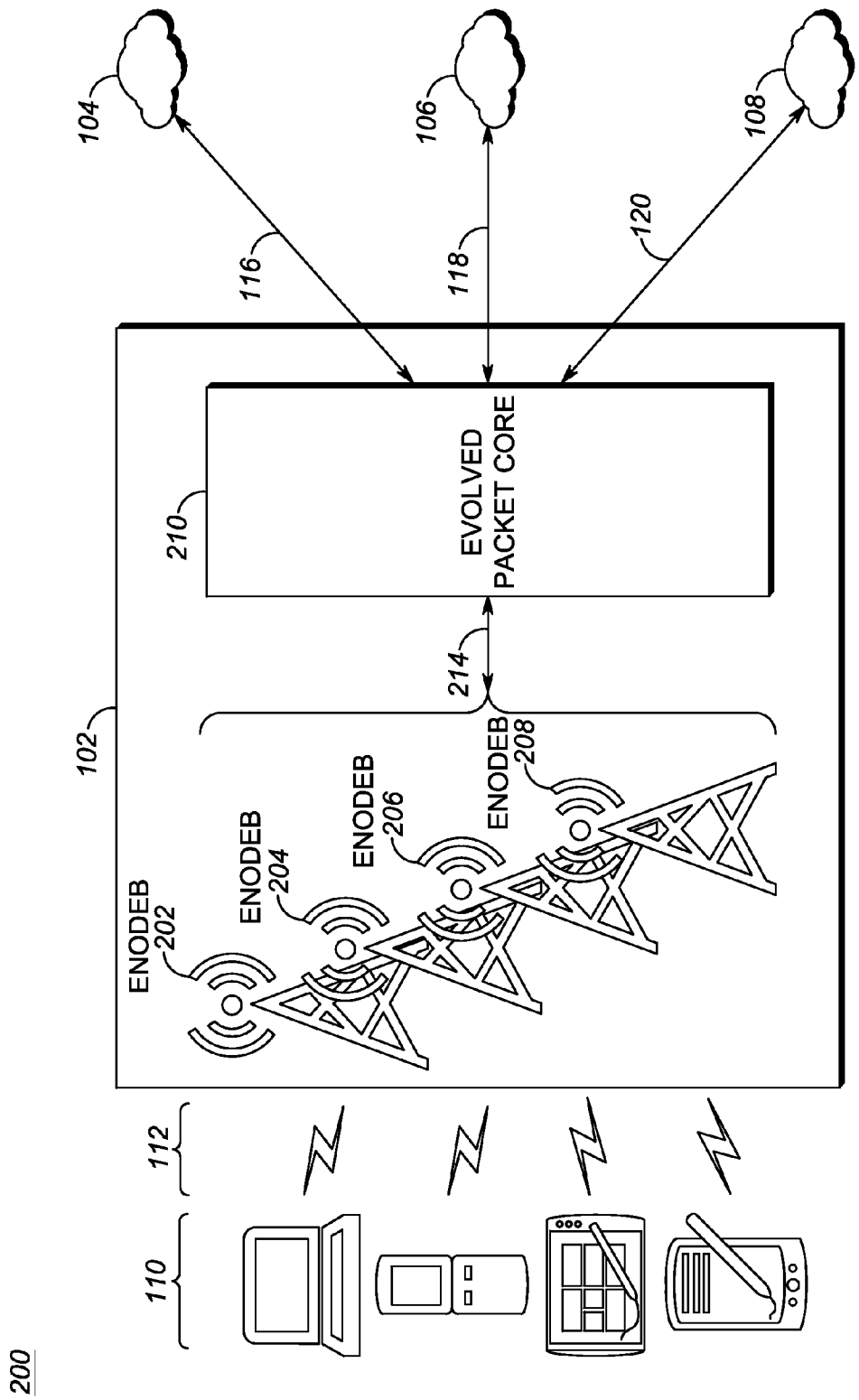
FIG. 2 depicts a further example of the communication system of FIG. 1 in accordance with an embodiment.

FIG. 2 also depicts the communication system 100 of FIG. 1, though FIG. 2 does so in more detail regarding some example WCDs 110 and an example RAN 102. In particular with respect to the RAN 102, FIG. 2 depicts the RAN 102 as including an eNodeB 202, an eNodeB 204, an eNodeB 206, and an eNodeB 208, each of which communicate directly or indirectly with an evolved packet core (EPC) 210 over a communication link 214. As is the case with each of the communication links mentioned above, and as is the case with any of the communication links mentioned anywhere else in this disclosure, the communication link 214 may be or include one or more wireless communication links and/or one or more wired communication links, as deemed suitable by those of skill in the relevant art in a given context.

In at least one embodiment, each of the eNodeBs 202-208 include the hardware and software (and/or firmware) necessary for that respective eNodeB to function as an eNodeB, a NodeB, a base station, a base transceiver station (BTS), a Wi-Fi access point, and/or the like, as known to those having skill in the relevant art. In some instances, one or more of the eNodeBs in the example RAN 102 may also include functionality typically associated in the art with entities that are often referred to by terms such as base station controllers (BSCs), radio network controllers (RNCs), and the like. Moreover, while four eNodeBs are depicted by way of example in FIG. 2, any suitable number of eNodeBs could be deployed as deemed suitable by those of skill in the art for a given implementation.

In general, each eNodeB 202-208 is an entity that, on one side (i.e., the wireless-network side (interface)), engages in wireless communication over the air interface 112 with one or more WCDs 110 according to a protocol such as LTE or the like and, on the other side (i.e., the "backhaul" side), engages in communications with the EPC 210 via the communication link 214, to facilitate communications between various WCDs 110 and networks such as the networks 104, 106, and 108.

The EPC 210 may include one or more network entities such as one or more mobility management entities (MMEs), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to the WCDs 110 via the eNodeBs 202-208, and to bridge such wireless service with various transport networks. In general, an example RAN 102 may provide wireless service according to a protocol such as LTE, Wi-Fi, and/or the like. These examples are provided for illustration and not by way of limitation; moreover, those of skill in the relevant art are aware of variations among different protocols and among different implementations of a given protocol, and of similarities across different protocols.

Figure 3:
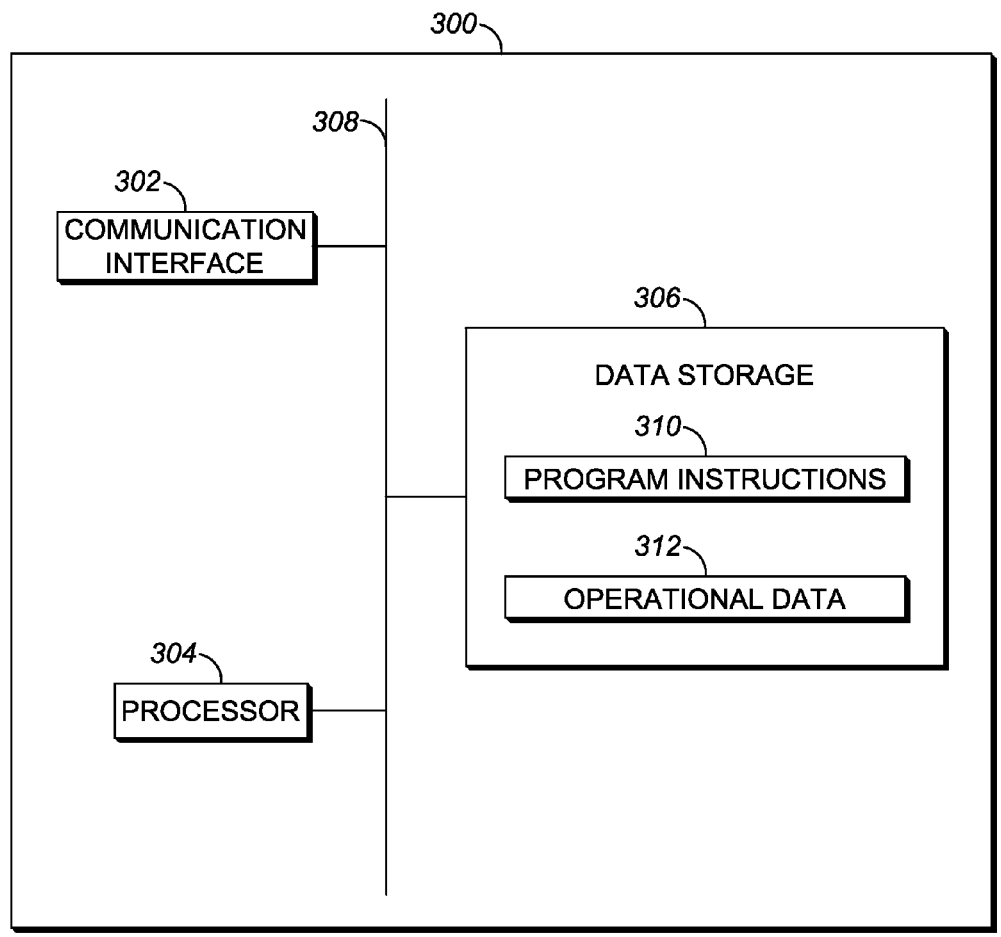
FIG. 3 depicts an example computing and communication device in accordance with an embodiment.

FIG. 3 depicts an example computing and communication device (CCD) 300 as including a communication interface 302, a processor 304, and a data storage 306, all of which are communicatively coupled with one another via a system bus (or other suitable communication mechanism, connection, network, or the like) 308.

The communication interface 302 may include one or more wireless-communication interfaces (for communicating according to, e.g., LTE, Wi-Fi, DMR, P25, TETRA, Bluetooth, and/or one or more other wireless-communication protocols) and/or one or more wired-communication interfaces (for communicating according to, e.g., Ethernet, USB, and/or one or more other wired-communication protocols). As such, the communication interface 302 may include any necessary hardware (e.g., chipsets, antennas, Ethernet cards, etc.), any necessary firmware, and any necessary software for conducting one or more forms of communication with one or more other entities as described herein. The processor 304 may include one or more processors of any type deemed suitable by those of skill in the relevant art, some examples including a general-purpose microprocessor and a dedicated digital signal processor (DSP).

The data storage 306 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 3, the data storage 306 contains program instructions 310 executable by the processor 304 for carrying out various functions. In an embodiment in which a computing system such as the example CCD 300 is arranged, programmed, and configured to carry out processes such as the process 600 described below, the program instructions 310 are executable by the processor 304 for carrying out those functions; in instances where other entities described herein have a structure similar to that of the example CCD 300, the respective program instructions 310 for those respective devices are executable by their respective processors 304 to carry out functions respectively performed by those devices.

In various different embodiments, a device (or system that includes multiple devices) such as the example CCD 300 could be suitably equipped, programmed, and configured to carry out the one or more functions described in this disclosure as being carried out by any one or any combination of the entities described herein and/or any other suitable computing and communication devices. In some embodiments, a device or system such as the CCD 300 could be equipped, programmed, and configured to carry out the process 600 that is described below.

Moreover, any one or more of the entities described herein could have an architecture or arrangement similar to that described in connection with the CCD 300. Examples such entities include: one or more entities in one or more of the RAN 102 (e.g., an eNodeB 202-208, the EPC 210); one or more of the entities in the RAN 104; one or more entities in the PSN 106; one or more entities in the CSN 108; one or more of the WCDs 110; the wireless-network testing system 400, the laptop computer 402, and/or the signal-attenuation module 406 of FIG. 4; the wireless-network testing system 500, the laptop computer 502, the signal-attenuation module 506, and/or the signal-attenuation module 514 of FIG. 5, and/or any other entities disclosed herein or any entities similar thereto.

Figure 4:
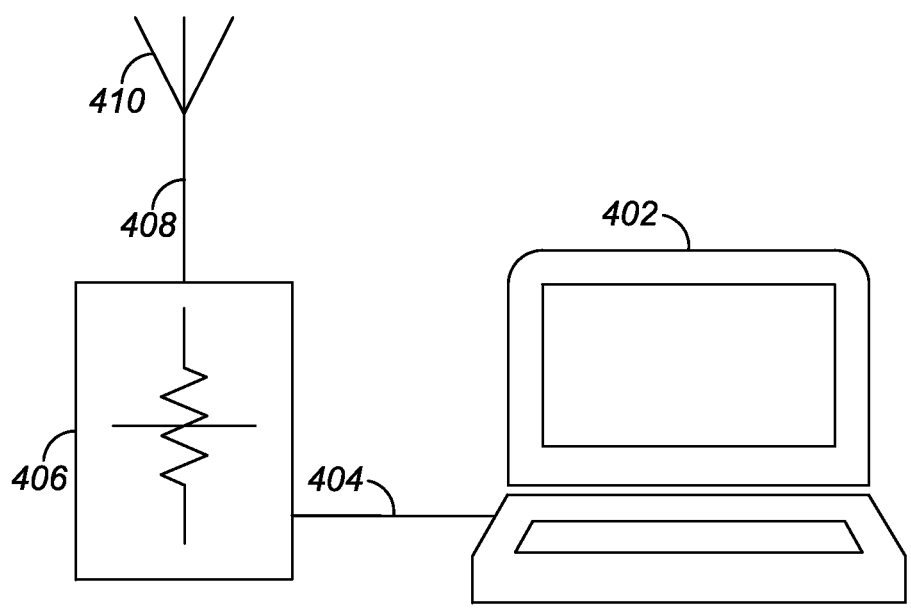
FIG. 4 depicts a first example wireless-network testing system in accordance with an embodiment.

FIG. 4 depicts an example wireless-network testing system 400 that could be used in accordance with one or more embodiments. As depicted in FIG. 4, the wireless-network testing system 400 includes a laptop computer 402 connected via a communication link 404 with a signal-attenuation module 406, which itself is connected via a communication link 408 with an antenna structure 410. Various functions carried out by a wireless-network testing system such as the wireless-network testing system 400 are described in various places throughout the present disclosure, including but not limited to being described in connection with the process 600 of FIG. 6.

The laptop computer 402 could be any suitable computer (or smartphone, tablet, and/or the like) that is equipped, configured, and programmed to function as described herein. In at least one embodiment, the laptop computer 402 includes—or at least is equipped, configured, and programmed to function as—a modem that functions as a WCD 110 with respect to, e.g., the RAN 102. In at least one embodiment, that modem is what is known in the art as a vehicle subscriber modem (VSM). In some embodiments, the modem may be a separate device forming part of a wireless-network testing system such as the wireless-network testing system 400 of FIG. 4. The communication links 404 and 408 could take any suitable form, such as but not limited to cables deemed suitable by one of skill in the relevant art in such a context.

The signal-attenuation module 406 could include one or more variable-resistance components, as known in the art for attenuating signals, and/or one or more components of any type deemed suitable by those of skill in the art for attenuating signals. The level of signal attenuation applied by the signal-attenuation module 406 could be controlled via a user interface of the signal-attenuation module 406 itself, via a user interface of the laptop computer 402 (by way of the communication link 404), and/or by one or more other ways deemed suitable by those of skill in the art. The antenna structure 410 could include one or more antennas, and in general could take any form deemed suitable by one of skill in the relevant art in such a context.

Figure 5:
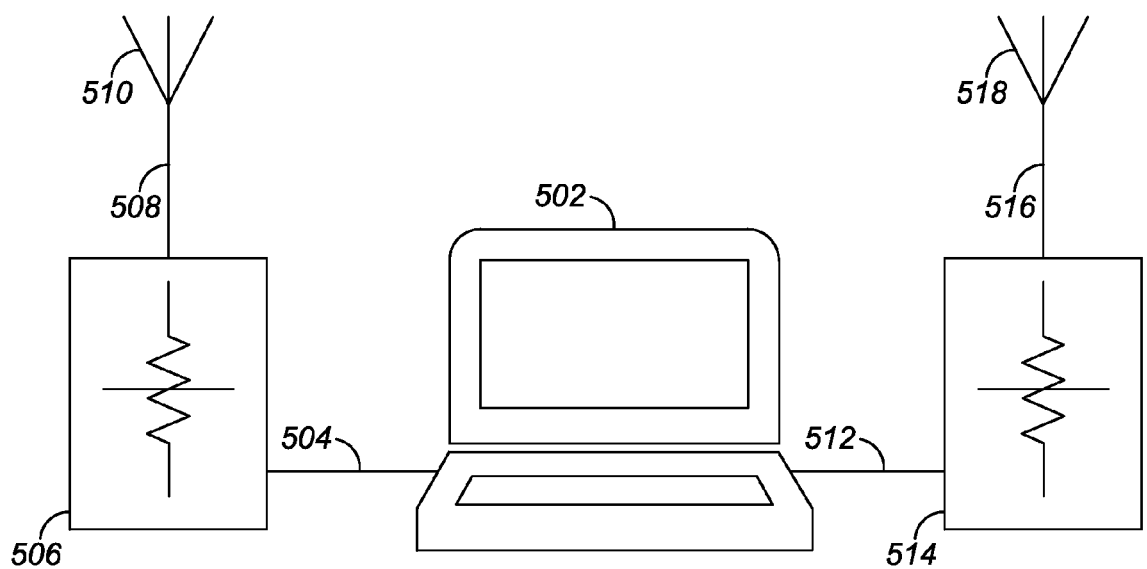
FIG. 5 depicts a second example wireless-network testing system in accordance with an embodiment.

FIG. 5 depicts an example wireless-network testing system 500 that could be used in accordance with one or more embodiments. As depicted in FIG. 5, the wireless-network testing system 500 includes a laptop computer 502 connected via a communication link 504 with a signal-attenuation module 506, which itself is connected via a communication link 508 with an antenna structure 510. As is also depicted in FIG. 5, the laptop computer 502 is connected via a communication link 512 with a signal-attenuation module 514, which itself is connected via a communication link 516 with an antenna structure 518. The wireless-network testing system 500 that is depicted in FIG. 5 is similar in several ways to the wireless-network testing system 400 that is depicted in FIG. 4, and thus is not described in as great of detail. Various functions carried out by a wireless-network testing system such as the wireless-network testing system 500 are described in various places throughout the present disclosure, including but not limited to being described in connection with the process 600 of FIG. 6.

In at least one embodiment, the antenna structure 510 is what is known to those having skill in the relevant art as the primary antenna, and the antenna structure 518 is what is known to those having skill in the relevant art as the diversity antenna. In at least one embodiment, the signal-attenuation modules 506 and 514 are separately controllable. In at least one embodiment, the signal-attenuation modules 506 and 514 are not separately controllable. In at least one embodiment, the signal-attenuation modules 506 and 514 are always set to attenuate their respective received signals by the same amount of attenuation. In at least one embodiment, the signal-attenuation modules 506 and 514 are not always set to attenuate their respective received signals by the same amount of attenuation.

Furthermore, with respect to the wireless-network testing systems 400 and 500, in some embodiments, using a given level of attenuation in the signal-attenuation module 406 would correspond to using that same given level of attenuation in both of the signal-attenuation modules 506 and 514; in other embodiments, however, using a given level of attenuation in the signal-attenuation module 406 would correspond to using half of that same given level of attenuation in each of the signal-attenuation modules 506 and 514. And certainly other examples could be implemented as well, as known to those having skill in the relevant art.

Figure 6:
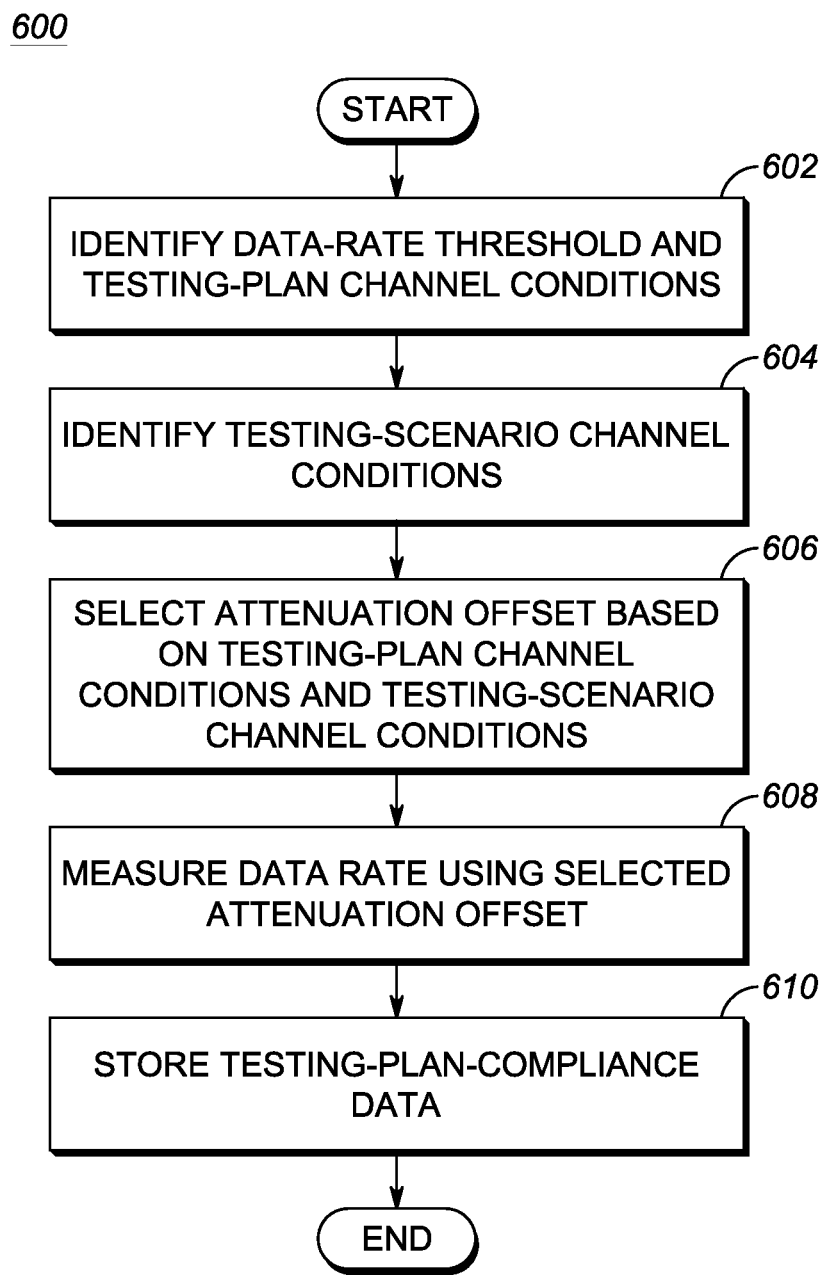
FIG. 6 depicts an example process in accordance with an embodiment.

FIG. 6 depicts an example process 600, which in at least one embodiment is carried out by a wireless-network testing system such as the wireless-network testing system 400 of FIG. 4 or the wireless-network testing system 500 of FIG. 5, as examples. In the ensuing description, by way of example, the process 600 is described as being carried out by the wireless-network testing system 400.

It often occurs during negotiations between a network provider and a customer that the network provider commits to providing a wireless network that meets certain specified performance metrics. One such metric is data throughput, perhaps specifically data throughput at a pre-defined layer (e.g., the network layer (at which a network-layer protocol such as IP might be implemented)) of what is known in the relevant art as the Open Systems Interconnected (OSI) stack.

In many instances, as part of or after such negotiations, a coverage map is generated with respect to a relevant geographical area in which wireless coverage is to be provided.

Figure 7:
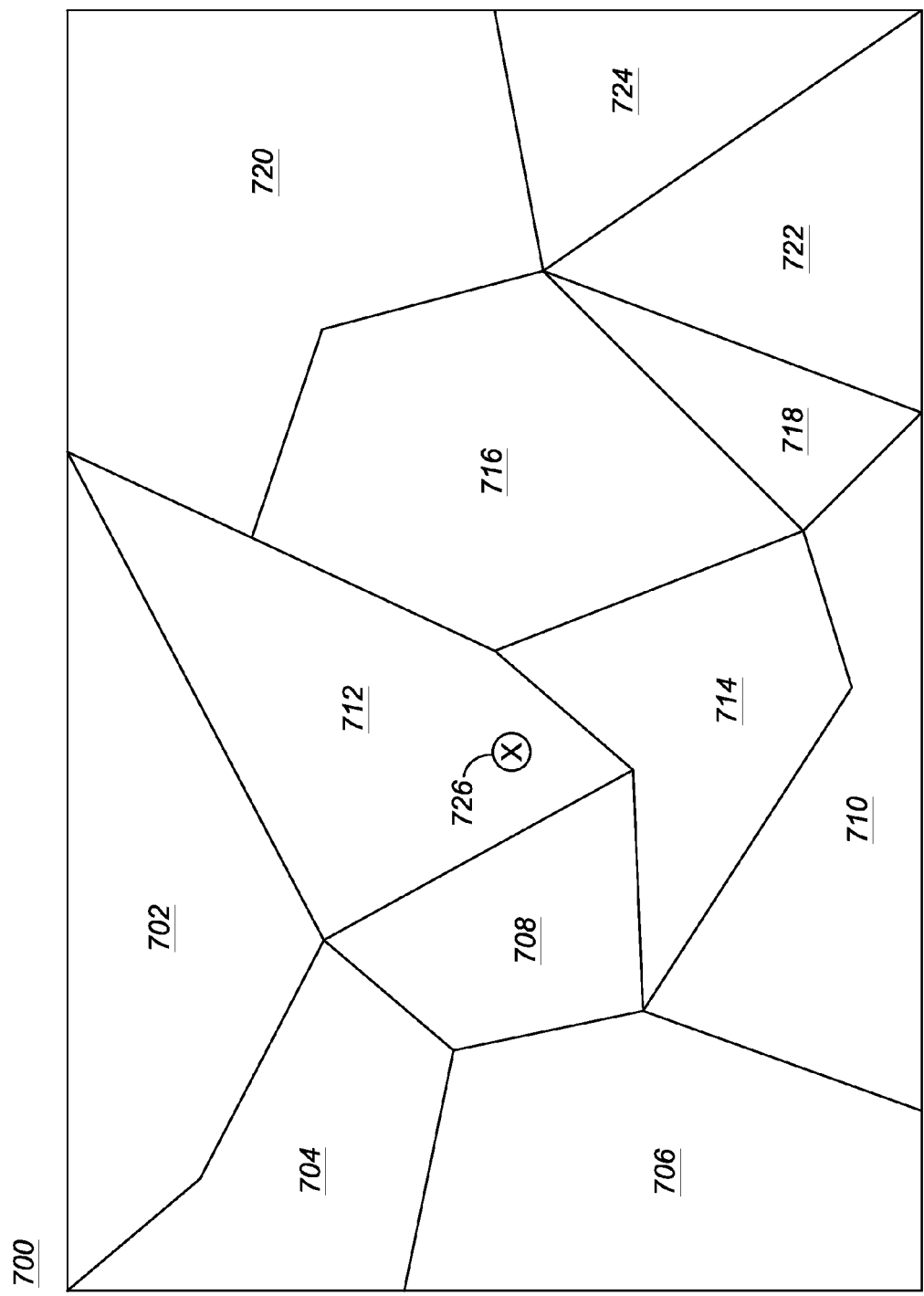
FIG. 7 depicts an example network coverage-area map in accordance with an embodiment.

FIG. 7 depicts a simplified example of such a coverage map. As can be seen in FIG. 7, the example coverage map 700 depicts a geographical area divided into polygons 702-724 of various shapes and sizes. The set of polygons 702-724 that is depicted in FIG. 7 is provided by way of example, as other options (e.g., interlocking hexagons) could certainly be used as well. Also depicted by way of example on FIG. 7 is an arbitrary location 726 within the polygon 712.

Figure 8:
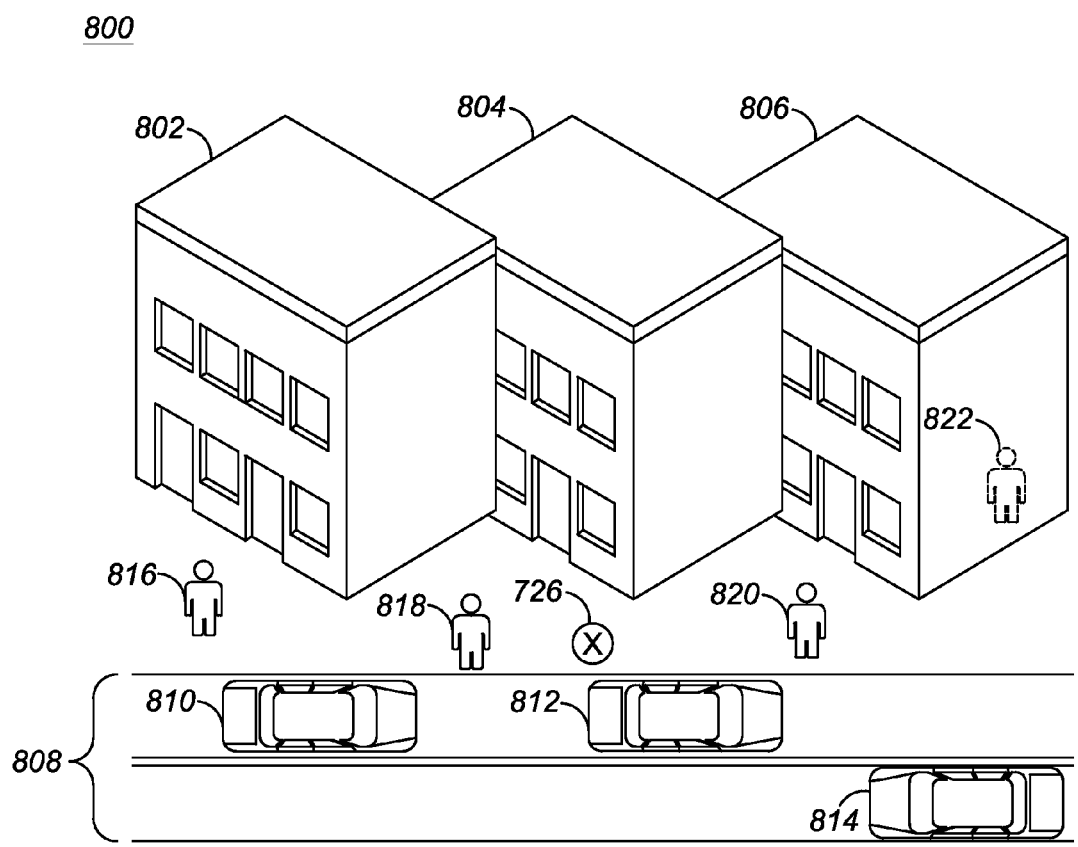
FIG. 8 depicts an example scenario for testing a wireless network in accordance with an embodiment.

FIG. 8 corresponds with FIG. 7 in that both include a depiction of the arbitrary location 726. In FIG. 7, the location 726 is simply depicted as being within the pre-defined polygon 712. In FIG. 8, the location 726 is depicted as being a geographical location of (or within) an example scene 800. As can be seen in FIG. 8, the example scene 800 includes not only the location 726, but also a building 802, a building 804, a building 806, a street 808, a vehicle 810, a vehicle 812, a vehicle 814, a person 816, a person 818, a person 820, and a person 822 (depicted as being inside of the building 806). The example scene 800 is provided purely by way of example.

FIG. 9 also corresponds with FIG. 7 (and therefore also with FIG. 8) in that FIG. 9 depicts an example data table 900 that correlates the coverage-map polygons 702-724 (and perhaps others, up to an arbitrarily denoted polygon N) with respective wireless-network testing plans 902-924 (and perhaps others, up to an arbitrarily denoted plan N). The data table 900 that is depicted in FIG. 9 is provided by way of example and not limitation, as in some instances more than one polygon could be associated with a given wireless-network testing plan, among many other possible variations on the depicted example.

Each such wireless-network testing plan 902-924 may list certain required data rates given certain channel-condition assumptions, which are referred to herein as testing-plan channel conditions, and which relate in various embodiments to factors such as the speed at which a given WCD is traveling, the fading channel type (e.g., EPA5, EVA70, ETU300, and the like), the antenna correlation, the presence of buildings (i.e., whether in-building coverage is being verified as part of a given testing plan), and/or one or more other channel conditions deemed suitable by those of skill in the art in a given context or for a given implementation.

After a testing plan (including but not limited to a required data rate (i.e., a data-rate threshold) and one or more assumed channel conditions (i.e., one or more testing-plan channel conditions)) for a given geographical area have been agreed upon, the wireless provider, the customer, and/or a third party may then engage in coverage acceptance testing to verify that the wireless network performs at the required data rate (i.e., at or above the agreed-upon data-rate threshold) in that geographical area. In at least one embodiment, the process 600 is carried out in connection with the performance of such coverage acceptance testing.

Among other aspects, the embodiment described herein as the process 600 involves varying received-signal attenuation in real-time (i.e., during coverage acceptance testing) to account for one or more differences between assumed testing-plan channel conditions and actual testing-scenario channel conditions. In some embodiments, the process 600 involves providing real-time feedback via a user interface of a testing system (such as testing system 400 of FIG. 4), perhaps to inform decisions such as whether, when, and/or where to retest various parts of a wireless network. The process 600 includes the steps 602, 604, 606, 608, and 610, which are described in turn below.

At step 602, the wireless-network testing system identifies a data-rate threshold and one or more testing-plan channel conditions (e.g., speed (at which the relevant WCD is traveling), fading channel type, antenna correlation, and the like). In various embodiments, the testing system may receive the identified data-rate threshold and the one or more identified testing-plan channel conditions via a user interface, via a network connection, and/or in some other manner deemed suitable by those of skill in the art. In some instances, the testing system is deployed in a vehicle (e.g., the vehicle 812) in order to conduct the associated coverage acceptance testing; this is by way of example, as deployments in which the testing system is being walked around, deployments in which the testing system is deployed on a train, and/or any other suitable deployment or deployments could be used as deemed suitable by those of skill in the relevant art.

In at least one embodiment, the testing system determines its current location, perhaps using a built-in GPS receiver, perhaps using a triangulation approach, perhaps by receiving an indication of its location via a user interface, and/or perhaps in one or more other ways. In at least one such embodiment, step 602 involves identifying the data-rate threshold and the one or more testing-plan channel conditions based at least in part on the determined current location. Thus, as an example, the testing system may determine that its current location is the location 726 that is marked on both FIG. 7 and FIG. 8, and may then index a local or remote copy of the map 700 to determine that the location 726 falls within the polygon 712, and in turn then index a local or remote data table such as the data table 900 of FIG. 9 to identify the test plan 912 as the testing plan that corresponds with the polygon 712. That identified test plan 912 may include the identified data-rate threshold and the one or more identified testing-plan channel conditions mentioned at step 602.

At step 604, the wireless-network testing system identifies testing-scenario channel conditions corresponding to the testing-plan channel conditions. As stated above, some example testing-plan channel conditions include conditions such as speed (at which the relevant WCD is traveling), fading channel type, antenna correlation, presence of buildings (i.e., whether or not in-building network coverage is being verified), and the like. As also stated above, the testing-plan channel conditions are assumed conditions. Step 604 involves the testing system identifying actual channel conditions that are prevailing at the time and at the place that the coverage acceptance testing is being conducted. (i.e., testing-scenario channel conditions).

In particular, step 604 involves identifying a testing-scenario (i.e., actual) channel condition corresponding to each of the testing-plan (i.e., assumed) channel conditions that were identified at step 602. As an example, a testing-plan channel condition could be that the relevant WCD is traveling at a walking speed such as 5 miles per hour (mph), and the corresponding testing-scenario channel condition could be that the testing system is deployed in a vehicle that is traveling 35 mph. And certainly numerous other examples involving speeds, and numerous other examples involving one or more other channel conditions could be listed as well.

At step 606, the wireless-network testing system selects an attenuation offset based on a comparison of the one or more identified testing-scenario channel conditions to the one or more identified testing-plan channel conditions.

In at least one embodiment, the one or more identified testing-plan channel conditions includes a testing-plan speed (e.g., a testing-plan Doppler shift), the one or more identified testing-scenario channel conditions includes a testing-scenario speed (e.g., a measured (i.e., testing-scenario) Doppler shift), and step 606 involves selecting the attenuation offset based on a comparison of the testing-scenario speed to the testing-plan speed. Some example attenuation adjustments based at least in part on comparing testing-plan speed to testing-scenario speed are described below.

In at least one embodiment, the one or more testing-plan channel conditions includes a testing-plan fading channel type (a.k.a. a propagation channel model, delay profile, delay spread, and the like) (e.g. EPA (Extended Pedestrian A model), EVA (Extended Vehicular A model), ETU (Extended Typical Urban model)), the one or more identified testing-scenario channel conditions includes a testing-scenario fading channel type, and step 606 involves selecting the attenuation offset based on a comparison of the testing-scenario fading channel type to the testing-plan fading channel type. Some example attenuation adjustments based at least in part on comparing testing-plan fading channel type to testing-scenario fading channel type are described below.

In at least one embodiment, the one or more testing-plan channel conditions includes a testing-plan antenna correlation, the one or more identified testing-scenario channel conditions includes a testing-scenario antenna correlation, and step 606 involves selecting the attenuation offset based on a comparison of the testing-scenario antenna correlation to the testing-plan antenna correlation. Some example attenuation adjustments based at least in part on comparing testing-plan antenna correlation to testing-scenario antenna correlation are described below.

In at least one embodiment, an identified testing-plan channel condition specifies validating in-building coverage, and step 606 involves including in the attenuation offset a positive attenuation value (e.g., 5 decibels (dB), 10 dB, 20 dB, or the like) calibrated to emulate in-building signal-penetration loss. The inclusion of that positive attenuation value in the attenuation offset would correspond to a situation where in-building coverage is being verified by network testing that is being done from outside of any building (e.g., by drive testing).

As a general matter, achieving a given data rate while traveling at a first speed requires that the WCD be receiving a first SINR, while achieving that same data rate while traveling at a second (higher) speed requires that the WCD be receiving a second (higher) SINR. Relatedly, in at least one embodiment, the testing system (i) identifies a first required SINR based at least in part on one or both of the identified data-rate threshold and the one or more identified testing-plan channel conditions and (ii) identifies a second required SINR based at least in part on one or both of the data-rate threshold and the one or more testing-scenario channel conditions; and in at least one such embodiment, step 606 involves selecting the attenuation offset to be equal to the difference between the first required SINR and the second required SINR.

Figure 10:
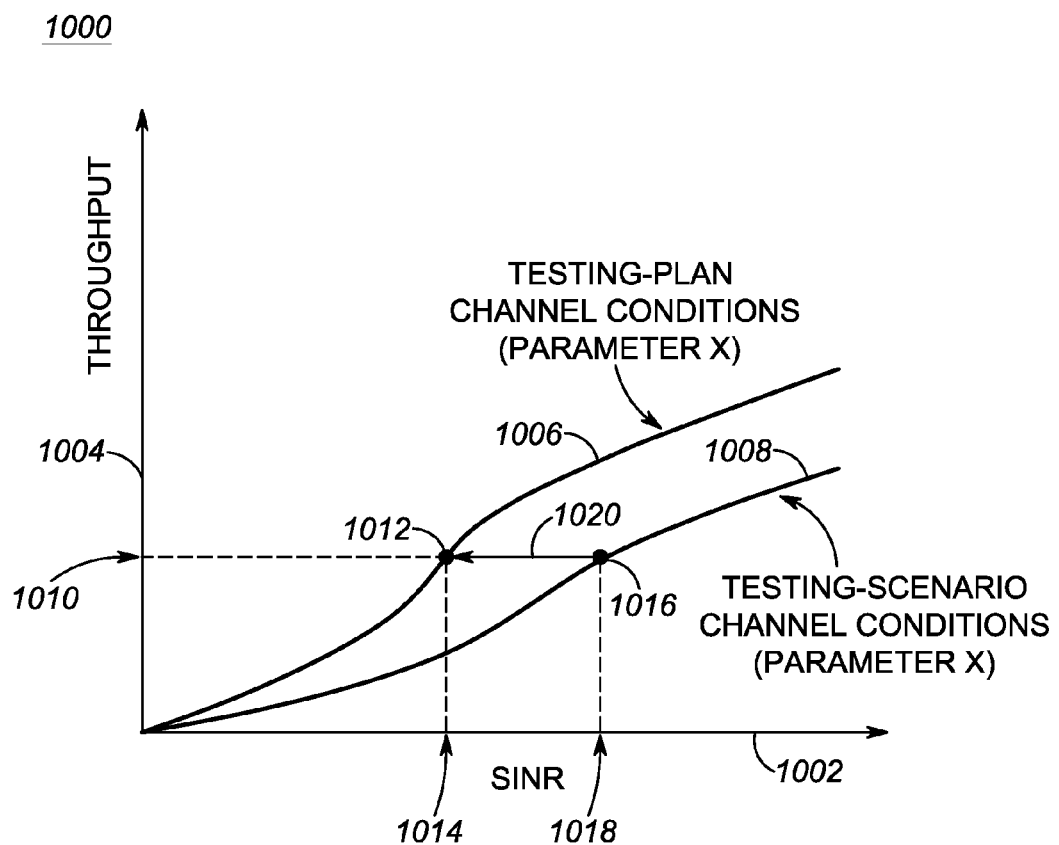
FIG. 10 depicts a first example graph showing two link curves that relate signal-to-interference-plus-noise ratio (SINR) to data throughput in accordance with an embodiment.
Figure 11:
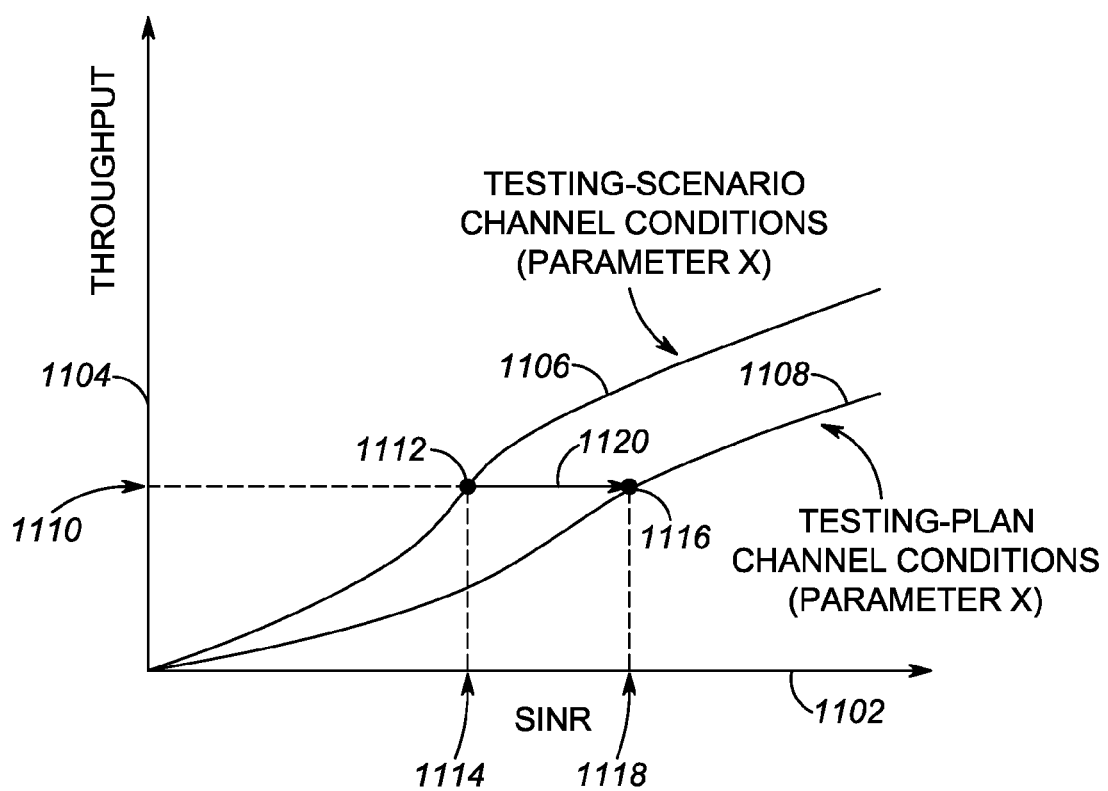
FIG. 11 depicts a second example graph showing two link curves that relate SINR to data throughput in accordance with an embodiment.

FIG. 10 and FIG. 11 each depict an example graph having two link curves that each graph data throughput as a function of SINR. In each of those two figures, one of the link curves corresponds to a testing-plan channel condition for a given parameter (e.g., speed), while the other of the link curves corresponds to a testing-scenario channel condition for that same given parameter. And while a single parameter is referenced with respect to FIGS. 10 and 11, this is for simplicity and not by way of limitation, as each link curve could just as well correspond to testing-plan and testing-scenario channel conditions expressed as respective sets of values for respective channel-condition parameters (e.g., speed, fading channel type, antenna correlation, and the like). Moreover, it is noted that the terms "data rate" and "data throughput" are used essentially interchangeably in various places in this disclosure, and it is further noted that, as used herein, both terms relate to expressing an amount of data transferred per some unit of time, and thus would have units of measurement such as megabits per second (Mbps) and the like, as is understood by those of skill in the art.

The example graph 1000 of FIG. 10 includes a horizontal axis 1002 that corresponds with SINR increasing from left to right, and further includes a vertical axis 1004 that corresponds with data throughput increasing from bottom to top. The graph 1000 includes a testing-plan link curve 1006 that graphs data throughput as a function of SINR for a certain channel condition (e.g., speed) being assumed to be equal to a first value (e.g., 5 mph) and a testing-scenario link curve 1008 that graphs data throughput as a function of SINR for the same channel condition (i.e., speed) being actually equal to a second value (e.g., 35 mph).

As can be seen in FIG. 10, for a given level 1010 of data throughput, the testing-plan link curve 1006 indicates (at point 1012) that, assuming testing-plan channel conditions (e.g., traveling at 5 mph), a SINR level marked 1014 corresponds to the data-throughput level 1010, while the testing-scenario link curve 1008 indicates (at point 1016) that, under actual testing-scenario channel conditions (e.g., traveling at 35 mph), a SINR level marked 1018 corresponds to the data-throughput level 1010.

Thus, to continue the present example, and assuming all other variables to be constant, a testing plan calling for verification at 5 mph and an actual testing scenario in which testing is being conducted at 35 mph would call for a negative attenuation amount to be applied using a signal-attenuation module (such as the signal-attenuation module 406 of FIG. 4), where that negative attenuation amount would increase the received SINR by an amount equal to the difference between the SINR level 1018 and the SINR level 1014, in order to be testing a signal that more accurately represents the signal that would be being received if the testing system were only traveling the test-plan-assumption speed of 5 mph (as opposed to the higher actual testing-scenario speed of 35 mph). This adjustment is indicated on the graph 1000 by an arrow 1020. Moreover, it is noted that, in at least one embodiment, the application of this negative attenuation amount takes the form of a reduction from a default level of attenuation to which the signal-attenuation module is initially set, where that default level is calibrated to account for fixed differences between the testing system and a handheld WCD associated with the test plan). And certainly numerous other examples could be presented as well, as known to those of skill in the art.

The graph 1100 of FIG. 11 is similar in content and numbering scheme to the graph 1000 of FIG. 10, and thus is not described in as great of detail. Essentially, the graph 1100 matches the graph 1000 other than (i) the numbering scheme being in the 11xx series instead of the 10xx series, (ii) a reversal of which link curve corresponds to the testing-plan channel conditions and which link curve corresponds to the testing-scenario channel conditions, and (iii) the direction of the arrow 1120 as compared with the direction of the arrow 1020. But given that speed is the channel condition that is being used in this description for purposes of illustration, the changes from FIG. 10 to FIG. 11—specifically those regarding which link curve corresponds to testing-plan channel conditions and which link curve corresponds to actual testing-scenario channel conditions—of course does not change which link curve corresponds to traveling at 5 mph and which link curve corresponds to traveling at 35 mph. In both graphs, the upper-left link curve (1006, 1106) corresponds to traveling at 5 mph and the lower-right link curve (1008, 1108) corresponds to traveling at 35 mph. That is, the relationship of throughput to SINR is what it is, irrespective of which curve is the testing plan and which curve is the actual testing scenario in a given instance.

As can be seen in FIG. 11, for a given level 1110 of data throughput, the testing-scenario link curve 1106 indicates (at point 1112) that, under actual testing-scenario channel conditions (e.g., traveling at 5 mph), a SINR level marked 1114 corresponds to the data-throughput level 1110, while the testing-plan link curve 1108 indicates (at point 1116) that, assuming testing-plan channel conditions (e.g., traveling at 35 mph), a SINR level marked 1118 corresponds to the data-throughput level 1110.

Thus, to continue the present example, and assuming all other variables to be constant, a testing plan calling for verification at 35 mph and an actual testing scenario in which testing is being conducted at only 5 mph would call for a positive attenuation amount to be applied using the signal-attenuation module, where that positive attenuation amount would reduce the received SINR by an amount equal to the difference between the SINR level 1118 and the SINR level 1114, in order to be testing a signal that more accurately represents the signal that would be being received if the testing system were in fact traveling the test-plan-assumption speed of 35 mph (as opposed to only a mere 5 mph). This adjustment is indicated on the graph 1100 by an arrow 1120. In at least one embodiment, the application of this positive attenuation amount is in addition to a default level of attenuation to which the signal-attenuation module is initially set; as described above, that default level could be calibrated to account for fixed differences between the testing system and a handheld WCD associated with the test plan. And certainly numerous other examples could be presented as well, as known to those of skill in the art.

Returning to the process 600 of FIG. 6, in at least one embodiment, the testing system determines a respective attenuation-offset component for each pair of testing-plan channel condition and testing-scenario channel condition; in at least one such embodiment, step 606 involves selecting the attenuation offset to be equal to the sum of those respective attenuation-offset components. For brevity and clarity of presentation, embodiments that involve the determination and summing of channel-condition-pair components to arrive at the selected attenuation offset are referred to below as "component embodiments." This is done for readability of this disclosure.

In at least one component embodiment, the one or more pairs of testing-plan channel condition and corresponding testing-scenario channel condition include a testing-plan speed and a testing-scenario speed; in at least one such component embodiment, the testing-scenario speed is greater than the testing-plan speed, and the respective attenuation-offset component for this pair is a negative attenuation value; in at least one other such component embodiment, the testing-scenario speed is less than the testing-plan speed, and the respective attenuation-offset component for this pair is a positive attenuation value.

In at least one component embodiment, the one or more pairs of testing-plan channel condition and corresponding testing-scenario channel condition include a testing-plan fading channel type and a testing-scenario fading channel type.

In at least one component embodiment, the one or more pairs of testing-plan channel condition and corresponding testing-scenario channel condition include a testing-plan antenna correlation and a testing-scenario antenna correlation; in at least one such component embodiment, the testing-scenario antenna correlation is greater than the testing-plan antenna correlation, and the respective attenuation-offset component for this pair is a negative attenuation value; in at least one other such component embodiment, the testing-scenario antenna correlation is less than the testing-plan antenna correlation, and the respective attenuation-offset component for this pair is a positive attenuation value. As a general matter, antenna correlation impacts throughput as higher antenna correlations tend to degrade diversity and spatial-multiplexing performance. WCDs generally measure and report antenna correlation as a correlation coefficient, which is a value between 0 (zero) (i.e., no correlation) and 1 (one) (i.e., 100% correlation). As such, in some embodiments, an assumed testing-plan antenna correlation and an actual testing-scenario measured antenna correlation are compared, and signal attenuation is adjusted accordingly.

In at least one component embodiment, the one or more pairs of testing-plan channel condition and corresponding testing-scenario channel condition include a testing-plan in-building status and a testing-scenario in-building status; in at least one such embodiment, the testing-plan in-building status is true (i.e., the testing plan calls for verifying coverage inside buildings), the testing-scenario in-building status is false (i.e., the testing is actually being conducted outside of any buildings), and the respective attenuation-offset component for this pair is a positive attenuation value; in at least one other such embodiment, the testing-plan in-building status is false (i.e., the testing plan calls for verifying coverage outside of any buildings), the testing-scenario in-building status is true (i.e., the testing is actually being conducted inside a building), and the respective attenuation-offset component for this pair is a negative attenuation value.

At 608, the wireless-network testing system measures a data rate with a testing-scenario attenuation level set equal to the selected attenuation offset. It is noted that the attenuation offset that is selected at step 606 and applied at step 608 may or may not be the actual attenuation value to which the signal-attenuation module is set during testing. In embodiments in which no other attenuation values are implemented during testing, the attenuation offset that is selected at step 606 may indeed be the actual attenuation value to which the signal-attenuation module is set during testing. In other embodiments, however, the attenuation offset that is selected at step 606 may be applied as a change to a default value of attenuation, where that changed value is then the level of attenuation to which the signal-attenuation module is set during testing. Indeed, In at least one embodiment, the following step is also carried out: attenuating the received signal by a device-emulation attenuation level for measuring the data rate, where the device-emulation attenuation level is a fixed value calibrated to account for one or more hardware-configuration differences between the testing system and a user equipment. Such hardware-configuration differences could include antenna gain, antenna height, cable loss, chipset performance, head/hand/body losses, noise figure, and/or the like.

At 610, the wireless-network testing system stores testing-plan-compliance data associated with the measured data rate and the data-rate threshold. In some embodiments, the testing-plan-compliance data includes Boolean indications as to whether or not the measured data rate met or exceeded the data-rate threshold. In some embodiments, the testing-plan-compliance data includes the actual measured data rate itself. In some embodiments, many measurements are taken and recorded, perhaps in data structures that also include information such as the relevant data-rate threshold for that measurement, the location at which that measurement was taken, the time, day, date, etc. at which that measurement was taken, and/or one or more other data values deemed relevant by those of skill in the art for a given implementation. In some embodiments, real-time indications of measured data rates and/or pass/fail indications regarding measured data rates and relevant thresholds are presented via a user interface. And certainly numerous other design choices could be made as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A wireless-network testing system comprising:
an antenna structure;
a modem;
a signal-attenuation module coupled inline in a receive path between the antenna structure and the modem, the signal-attenuation module attenuating received signals;
a processor; and
data storage containing instructions executable by the processor for causing the wireless-network testing system to carry out a set of functions, the set of functions including:
determining a data rate;
determining a first speed;
determining a second speed;
determining a first signal-to-interference-plus-noise ratio (SINR) needed to achieve the data rate at the first speed;
determining a second SINR needed to achieve the data rate at the second speed;
adjusting an attenuator on the signal-attenuation module based on the difference between the first SINR and the second SINR;
wherein the difference between the first SINR and the second SINR is determined from link curves that specify SINR vs. data rate at different speeds.

2. The apparatus of claim 1 wherein the first speed comprises a test-plan-assumption speed.

3. The apparatus of claim 2 wherein the second speed comprises a testing-scenario speed.

4. A method comprising the steps of:
determining a data rate;
determining a first speed;
determining a second speed;
determining a first signal-to-interference-plus-noise ratio (SINR) needed to achieve the data rate at the first speed;
determining a second SINR needed to achieve the data rate at the second speed;
adjusting an attenuator on the signal-attenuation module based on the difference between the first SINR and the second SINR;
wherein the difference between the first SINR and the second SINR is determined from link curves that specify SINR vs. data rate at different speeds.

5. The method of claim 4 wherein the first speed comprises a test-plan-assumption speed.

6. The method of claim 5 wherein the second speed comprises a testing-scenario speed.

* * * * *